UNITED STATES PATENT OFFICE.

ALAN I. APPELBAUM, OF TRENTON, NEW JERSEY, ASSIGNOR TO THE IMPORT AND BY PRODUCTS COMPANY, INCORPORATED, OF TRENTON, NEW JERSEY, A CORPORATION OF DELAWARE.

SULFUR COLOR AND PROCESS OF MANUFACTURING THE SAME FROM ALOE RESIN.

1,346,153.     Specification of Letters Patent.     Patented July 13, 1920.

No Drawing.     Application filed June 10, 1918. Serial No. 239,178.

*To all whom it may concern:*

Be it known that I, ALAN I. APPELBAUM, a citizen of the United States, residing in the city of Trenton, State of New Jersey, have invented a certain Sulfur Color and Process of Manufacturing the Same from Aloe Resin, of which the following is a specification.

In the manufacture of sulfur colors, the practice heretofore has been to employ coal tar intermediates which are expensive and costly. I have discovered that sulfur colors of equal fastness and desirability may be produced by the employment of aloe resin, obtained as a residue or by-product remaining after the extraction of aloin from aloes.

It is one object of my invention to cheapen the process employed in the manufacture of sulfur colors by the employment in the manufacture of the same of an ingredient which may be obtained very cheaply and which has not heretofore been employed in the manufacture of such colors.

A further object of my invention is to vary the shade and hue of the colors produced by using aloe resin as a base.

In the carrying out of my invention, I may employ a mixture of sulfur, caustic soda or other alkali, and aloe resin with water and subject the same to certain treatment, as will be hereinafter set forth, or I may employ a mixture of sulfur, aloe resin and sodium sulfid with water, or I may employ a mixture of sodium sulfid with aloe resin alone with water and subject the same to certain treatment as will hereinafter be set forth for the purpose of causing the same to combine to form the color sought.

Although not necessary, I may add to these mixtures a salt of certain metals such as copper, iron, zinc, nickel, cobalt, cerium or other rare metals, or a compound such as benzidin. The addition of one of these metallic salts, a mixture thereof or of the benzidin causes the production of a color of different shade and brighter hue.

Other objects and advantages of my invention will be referred to in the detailed description thereof which follows, or will be apparent from such description.

In view of the fact that my invention is not dependent upon any particular form of apparatus, but may be carried out in any known form of apparatus used at the present time by manufacturers of sulfur colors or dyes, I do not deem it necessary to provide drawings illustrating an apparatus,—particularly as the apparatus employed consists only of a suitable digester in which the mixture of materials is treated.

In the carrying out of my invention, I may mix together caustic soda or other alkali, sulfur and aloe resin in equal parts with four or five parts of water and subject the same to a temperature sufficiently high to effect boiling of the same, at atmospheric pressure, for a period of several hours. I have obtained the best results by maintaining such treatment during a continuous period of six or eight hours, although my invention is not limited to a treatment of that particular or exact length of time.

I may also employ, instead of caustic soda and sulfur, sodium sulfid, the latter and the aloe resin being mixed together in equal portions.

I have also discovered that the process may be carried out by the mixing together of aloe resin, sulfur and sodium sulfid in equal proportions and four or five parts of water, the mixture being subjected to a heat sufficient to cause boiling of the same at atmospheric pressure for a length of time such as above suggested.

Although I have suggested that the ingredients mentioned above may be employed in equal proportions, I desire it to be understood that these proportions may be varied without departing from my invention. For instance, when a mixture of aloe resin, sodium sulfid, sulfur and water is employed, the quantity of sulfur used may be half of the quantity of sodium sulfid or of the aloe resin, and also the quantity of water may be varied.

The last example is given merely to show that the quantities of the respective materials employed may be varied through wide ranges without departing from my invention.

It may happen that a color of different shade and brighter hue than would be produced by employing the mixtures as above described alone, is desired. If this should be the case, the desired result may be produced by including in the mixture a salt of certain metals such as copper, iron, zinc, nickel, cobalt, cerium or other rare metals, or a mixture thereof, or certain compounds, such as benzidin.

The introduction of these substances causes the production of colors of different shade and brighter hue.

Instead of subjecting the mixtures as above described to boiling temperature at atmospheric pressure, the said mixtures may be heated under pressure greater than atmospheric pressure to such temperatures as may be desired. By varying the temperature at which the process is carried out the color produced is varied. The higher the temperature employed in the process the darker the color.

After the mixtures shall have been subjected to a boiling temperature at atmospheric pressure for a period of six or eight hours, or, if heated to the temperature desired under pressure greater than atmospheric pressure, for a period of two or three hours, the reaction will have been completed,—the mixture being in liquid form, which liquid is then withdrawn into a tank and treated with a dilute acid such as sulfuric or hydrochloric acid, for the purpose of precipitating the dye or color.

After the dye or color has been precipitated, it is filter pressed, washed, dried and ground in any known manner, and is then ready for use.

I claim:—

1. The process of producing a sulfur color, which comprises mixing together aloe resin, sulfur, sodium sulfid and water and applying heat thereto.

2. The process of producing a sulfur color which comprises mixing together aloe resin, sulfur, sodium sulfid and water and subjecting the same to heat to effect reactions between the ingredients of the said mixture and thereafter treating the said mixture with a dilute acid to precipitate the color material.

3. The process of producing a sulfur color, which comprises mixing together aloe resin, sulfur and sodium sulfid and heating the same under pressure in the presence of water.

4. The process of producing a sulfur color which comprises mixing together aloe resin, sulfur, sodium sulfid, a metallic salt and water and heating the said mixture to cause reactions between the ingredients of the same and thereafter treating the resulting liquid product with a suitable dilute acid.

5. The process of producing a sulfur color which comprises mixing together aloe resin, sulfur, sodium sulfid and water and subjecting the same to heat to effect reactions between the ingredients of the said mixture to form a liquid and thereafter precipitating the color material from said liquid.

6. The process of producing a sulfur color which comprises mixing together aloe resin, sulfur, sodium sulfid, a metallic salt and water and heating the said mixture to cause reactions between the ingredients thereof, forming a liquid and thereafter precipitating the color material from said liquid.

7. The process of producing a sulfur color which comprises mixing together aloe resin, sulfur and sodium sulfid and water and heating the same under a pressure greater than atmospheric pressure.

8. The process of producing a sulfur color which comprises mixing together aloe resin, sulfur and sodium sulfid and water and heating the same under a pressure greater than atmospheric pressure, and dissolving the resulting product in water and precipitating from the solution thus formed the color material.

9. The process of producing a sulfur color which comprises mixing together aloe resin, an alkali sulfid and water, and heating the same to cause reactions to produce said color.

10. The process of producing a sulfur color, which comprises the heating of a mixture of aloe resin, an alkali sulfid and a metallic salt in the presence of water.

11. The process of producing a sulfur color which comprises the subjection of aloe resin to alkaline sulfur fusion.

12. The sulfur color containing the reaction products of aloe resin, alkali sulfid and sulfur.

13. A sulfur color resulting from the alkaline sulfur fusion of aloe resin.

In testimony that I claim the foregoing as my invention, I have hereunto signed my name this 6th day of June, A. D., 1918.

ALAN I. APPELBAUM.